United States Patent
Nemes et al.

(10) Patent No.: US 12,197,415 B1
(45) Date of Patent: *Jan. 14, 2025

(54) METHODS AND APPARATUS FOR INFORMATION STORAGE AND RETRIEVAL USING A CACHING TECHNIQUE WITH PROBE-LIMITED OPEN-ADDRESS HASHING

(71) Applicants: Richard Michael Nemes, Woodmere, NY (US); Mikhail Lotvin, Sunnyvale, CA (US); David Garrod, Pittsburgh, PA (US)

(72) Inventors: Richard Michael Nemes, Woodmere, NY (US); Mikhail Lotvin, Sunnyvale, CA (US); David Garrod, Pittsburgh, PA (US)

( * ) Notice: Subject to any disclaimer, the term of this patent is extended or adjusted under 35 U.S.C. 154(b) by 149 days.

This patent is subject to a terminal disclaimer.

(21) Appl. No.: 17/898,963

(22) Filed: Aug. 30, 2022

Related U.S. Application Data

(63) Continuation of application No. 16/233,342, filed on Dec. 27, 2018, now Pat. No. 11,468,033, and a continuation of application No. 14/755,454, filed on Jun. 30, 2015, now Pat. No. 10,204,127, and a continuation of application No. 13/342,018, filed on Dec. 31, 2011, now Pat. No. 9,104,678.

(51) Int. Cl.
| | | |
|---|---|---|
| *G06F 16/23* | (2019.01) | |
| *G06F 16/13* | (2019.01) | |
| *G06F 16/172* | (2019.01) | |
| *G06F 16/22* | (2019.01) | |

(52) U.S. Cl.
CPC .......... *G06F 16/235* (2019.01); *G06F 16/137* (2019.01); *G06F 16/172* (2019.01); *G06F 16/2237* (2019.01); *G06F 16/2365* (2019.01)

(58) Field of Classification Search
CPC .. G06F 16/235; G06F 16/2237; G06F 16/137; G06F 16/2365; G06F 16/172
USPC .......................................................... 707/698
See application file for complete search history.

(56) References Cited

U.S. PATENT DOCUMENTS

| | | | | |
|---|---|---|---|---|
| 5,226,092 A | * | 7/1993 | Chen ...................... | G06N 3/063 |
| | | | | 382/157 |
| 5,490,258 A | * | 2/1996 | Fenner ................ | H03M 7/4006 |
| | | | | 707/999.001 |

(Continued)

OTHER PUBLICATIONS

Cormen et al., "Introduction To Algorithms—Third Edition," 2009, The MIT Press, 1313 pages printed (Year: 2009).

(Continued)

*Primary Examiner* — Tony Mahmoudi
*Assistant Examiner* — Michael Le

(57) ABSTRACT

A method and apparatus for performing storage and retrieval in an information storage system cache is disclosed that uses the hashing technique with the open-addressing method for collision resolution. Insertion, retrieval, and deletion operations are limited to a predetermined number of probes, after which it may be assumed that the table does not contain the desired data. Moreover, when using linear probing, the technique facilitates maximum concurrent, multi-thread access to the table, thereby improving system throughput, since only a relatively small section is locked and made unavailable while a thread modifies that section, allowing other threads complete access to the remainder of the table.

20 Claims, 9 Drawing Sheets

(56) References Cited

U.S. PATENT DOCUMENTS

| | | | |
|---|---|---|---|
| 5,991,847 A | 11/1999 | Ballard et al. | |
| 6,625,612 B1 | 9/2003 | Tai et al. | |
| 6,658,652 B1* | 12/2003 | Alexander, III | G06F 11/366 |
| | | | 711/6 |
| 7,031,985 B1* | 4/2006 | Pecheny | G06F 16/90344 |
| 7,788,240 B2 | 8/2010 | Rossmann | |
| 7,809,701 B2 | 10/2010 | Blake | |
| 9,081,672 B1 | 7/2015 | Nemes | |
| 2005/0091443 A1 | 4/2005 | Hershkovich et al. | |
| 2006/0143168 A1 | 6/2006 | Rossmann | |
| 2007/0073733 A1 | 3/2007 | Matthews et al. | |
| 2007/0083531 A1* | 4/2007 | Hussain | H04L 9/0643 |
| 2007/0294506 A1* | 12/2007 | Ross | G06F 12/0897 |
| | | | 711/216 |
| 2010/0023727 A1* | 1/2010 | Lim | H04L 45/745 |
| | | | 711/216 |
| 2010/0070509 A1* | 3/2010 | Li | G06F 16/41 |
| | | | 707/747 |
| 2011/0252216 A1* | 10/2011 | Ylonen | G06F 9/52 |
| | | | 711/170 |
| 2012/0195208 A1* | 8/2012 | Abel | H04L 69/22 |
| | | | 370/252 |
| 2012/0222005 A1 | 8/2012 | Harris et al. | |

OTHER PUBLICATIONS

Gao et al., "Non-Blocking Dynamic Hash Tables With Open Addressing," Jul. 2004, 48 pages printed (Year: 2004).

Gao et al., "Lock-Free Dynamic Hash Tables With Open Addressing," Nov. 2004, 22 pages printed (Year: 2004).

Kolosovskiy, Maxim, "Simple Implementation Of Deletion From Open Address Hash Table," Sep. 2009 (from PDF metadata), 6 pages printed (Year: 2009).

Luo et al., "Comparison Of Different Open Addressing Hashing Algorithms," Feb. 2003 (PDF metadata), 4 pages printed (Year: 2003).

Unknown, "Fundamental Data Structures," Nov. 17, 2011, pp. 104-125, 366 pages printed (Year: 2011).

\* cited by examiner

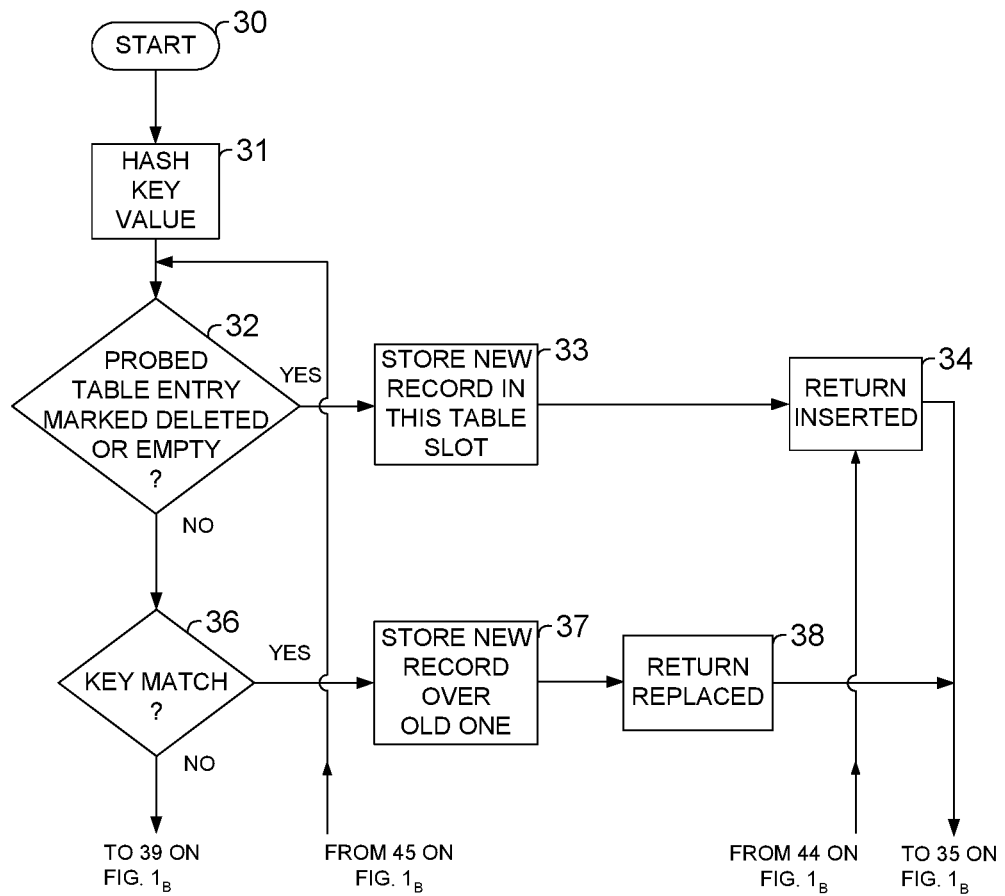
FIG. 1_A

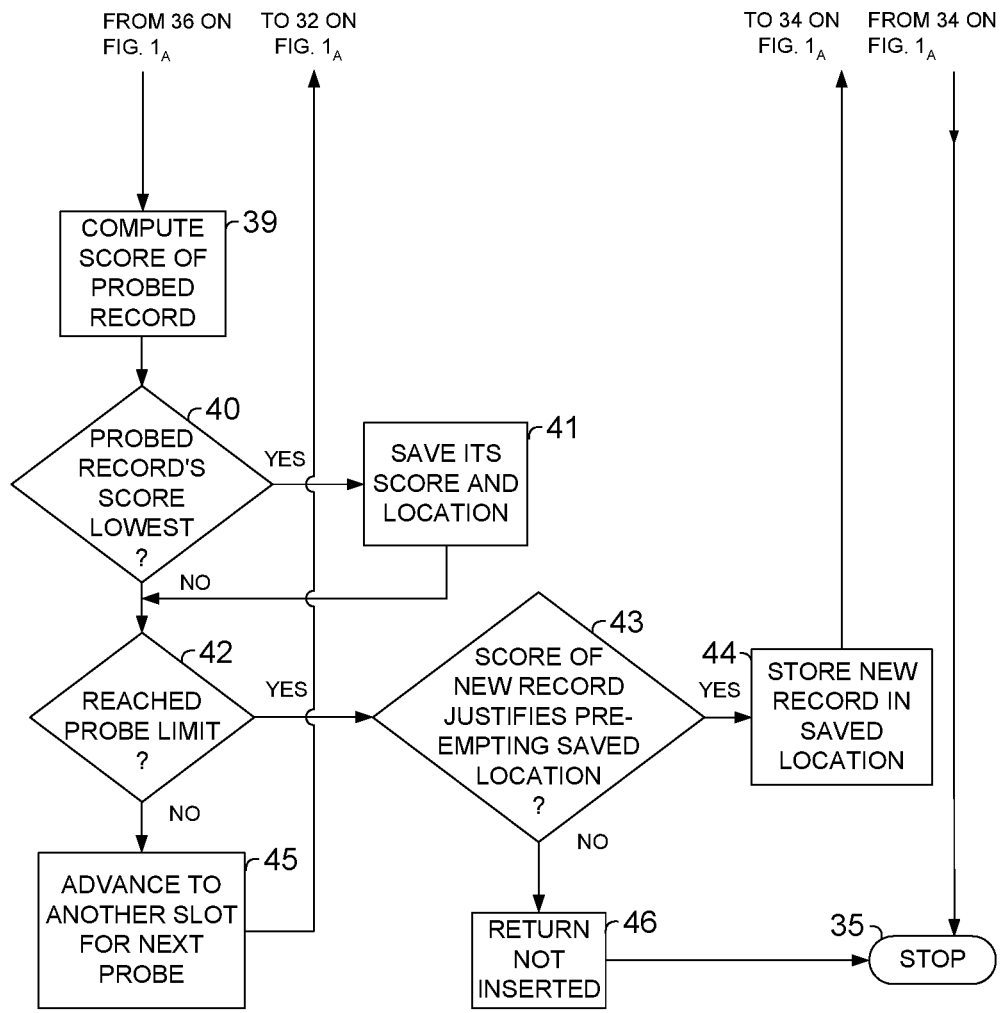
FIG. 1_B

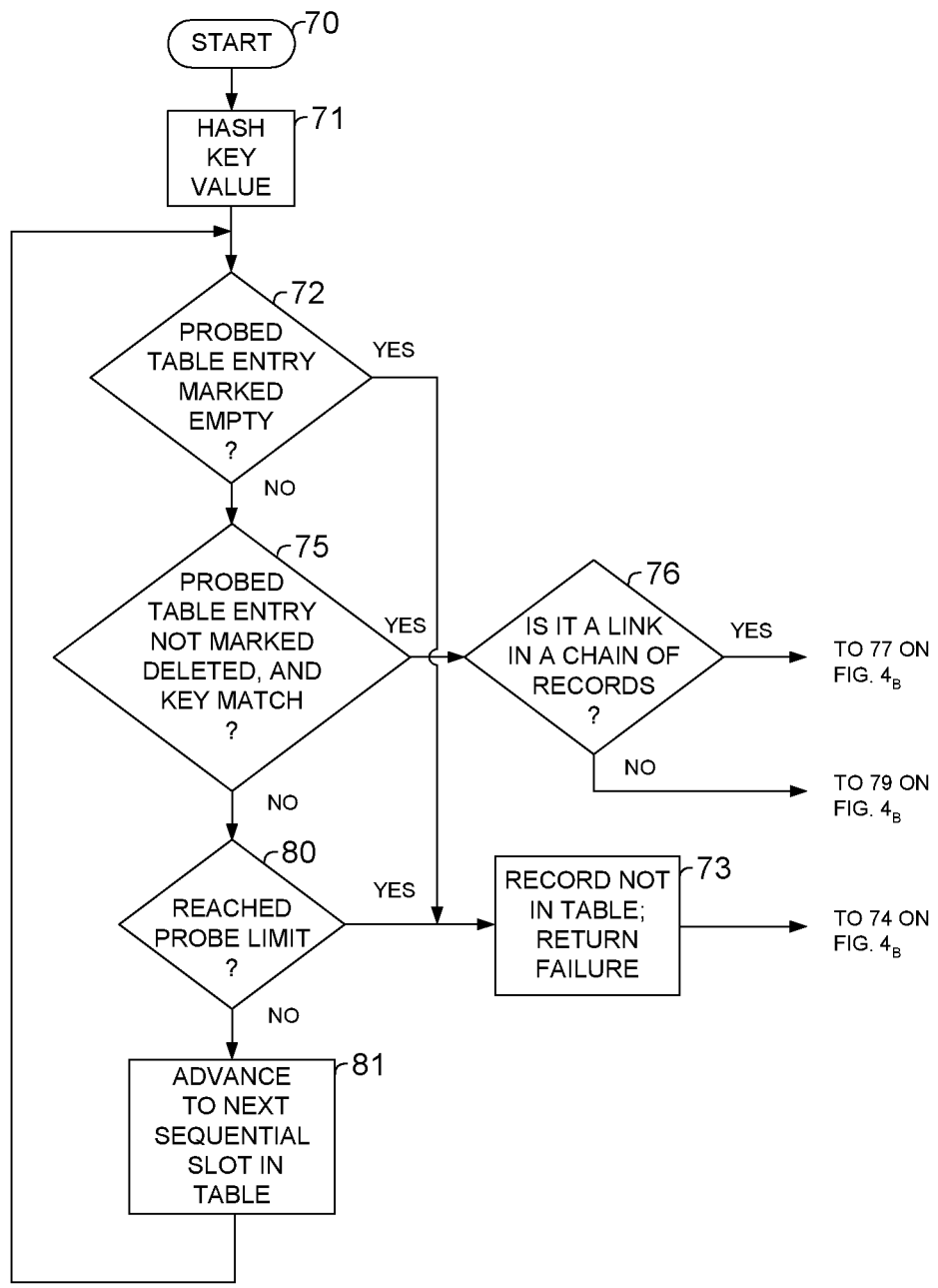
FIG. 4$_A$

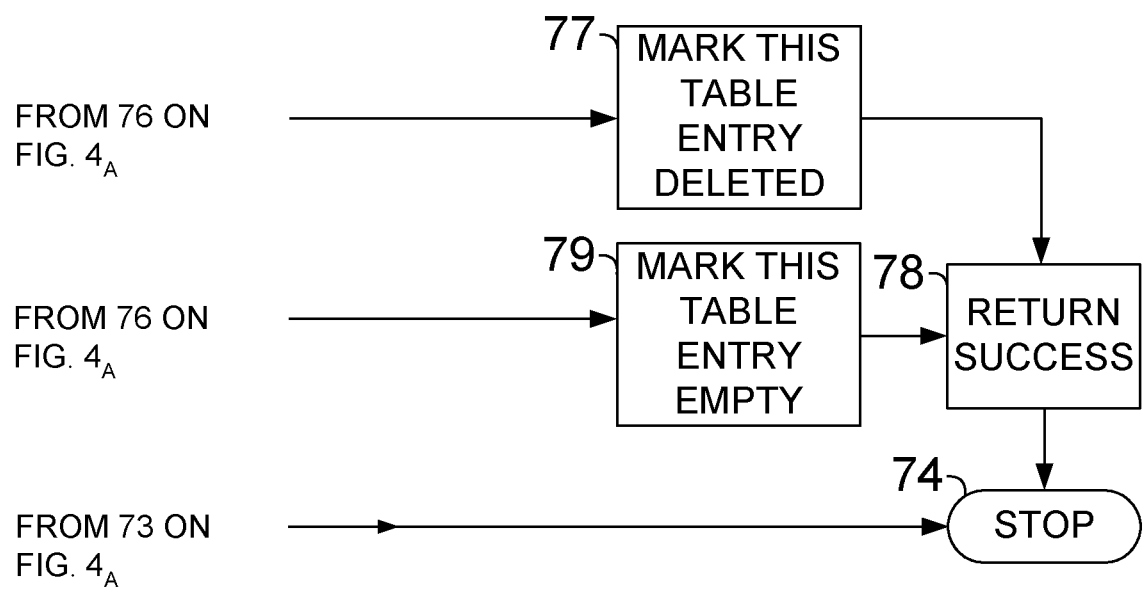
FIG. 4$_B$

METHODS AND APPARATUS FOR INFORMATION STORAGE AND RETRIEVAL USING A CACHING TECHNIQUE WITH PROBE-LIMITED OPEN-ADDRESS HASHING

CROSS REFERENCE TO RELATED APPLICATIONS

This application is a continuation of U.S. patent application Ser. No. 16/233,342, filed Dec. 27, 2018, now U.S. Pat. No. 11,468,033, which is a continuation of U.S. patent application Ser. No. 14/755,454, filed Jun. 30, 2015, now U.S. Pat. No. 10,204,127, which is a continuation of U.S. patent application Ser. No. 13/342,018, filed Dec. 31, 2011, now U.S. Pat. No. 9,104,678.

BACKGROUND

This invention relates to information storage and retrieval systems, and, more particularly, to the use of hashing techniques in caching systems.

Techniques for caching frequently-used data have been in use for many decades, and provide fast access to information that would otherwise require long retrieval times or lengthy computation. A cache is a storage mechanism that holds a desired subset of data that is stored in its entirety elsewhere, or data that results from a lengthy computation. Its purpose is to make future accesses to a stored data item faster. A cache is usually dynamic in nature: items stored in it may not reside there permanently, and frequently those items whose future usefulness is questionable are replaced by items predicted to be more useful. Typically, but not exclusively, older items are replaced by newer ones. Successful application of caching, for example, can be found in the routing caches used by Internet servers to provide quick access to network routing information.

Records stored in a computer-controlled storage mechanism such as a cache are retrieved by searching for a particular key value among stored records, a key being a distinguished field (or collection of fields) in a record, which is defined to be a logical unit of information. The stored record with a key matching the search key value is then retrieved. Though data caching can be done using a variety of techniques, the use of hashing has become a popular way of building a cache because of its speed advantage over other information retrieval methods. Hashing is fast compared to other information storage and retrieval methods because it requires very few key comparisons to locate a requested record.

Hashing methods use a hashing function that operates on—technical term is maps—a key to produce a storage address in the storage space, called the hash table, which is a large one-dimensional array of record locations. This storage address is then accessed directly for the desired record. Hashing techniques are described in the classic text by D. E. Knuth entitled *The Art of Computer Programming*, Volume 3, Sorting and Searching, Addison-Wesley, Reading, Massachusetts, 1973, pp. 506-549, in *Data Structures and Program Design*, Second Edition, by R. L. Kruse, Prentice-Hall, Incorporated, Englewood Cliffs, New Jersey, 1987, Section 6.5, "Hashing," and Section 6.6, "Analysis of Hashing," pp. 198-215, and in *Data Structures with Abstract Data Types and Pascal*, by D. F. Stubbs and N. W. Webre, Brooks/Cole Publishing Company, Monterey, California, 1985, Section 7.4, "Hashed Implementations," pp. 310-336.

Hashing functions are designed to translate the universe of keys into addresses uniformly distributed throughout the hash table. Typical hashing functions include truncation, folding, transposition, and modulo arithmetic. A disadvantage of hashing is that more than one key will inevitably translate to the same storage address, causing collisions in storage. Some form of collision resolution must therefore be provided. Resolving collisions within the hash table itself by probing other elements of the table is called open addressing. For example, the simple open addressing strategy called linear probing, which views the storage space as logically circular and consists of searching in a forward direction from the initial storage address to the first empty storage location, is often used.

Another method for resolving collisions is called external chaining. In this technique, each hash table location is a pointer to the head of a linked list of records, all of whose keys map under the hashing function to that very hash table address. The linked list is itself searched sequentially when retrieving, inserting, or deleting a record, and insertion and deletion are done by adjusting pointers in the linked list.

Open addressing and external chaining each enjoy advantages over the other. Though external chaining can make better use of memory because it doesn't require initial pre-allocation of maximum storage and supports concurrency with the easy ability to lock individual linked lists, its individual record access time can be slower because of memory allocation/de-allocation and pointer dereferencing. Furthermore, because successive records in a linked list rarely reside in physically consecutive memory locations, external chaining cannot take advantage of memory paging and physical memory caching.

In the design of routing caches, it is important to protect the system against a security threat known as a denial of service (DOS) attack. Attackers could target the routing cache by sending the server carefully crafted service requests aimed at creating excessive collisions, thereby degrading cache storage and retrieval times. (These kind of DOS attacks are called algorithmic complexity attacks.) While there are effective techniques to protect against such attacks in chain hashing, there is a need to implement a data cache that provides the speed of open-addressed hashing while, at the same time, avoiding vulnerability to denial of service algorithmic attacks and allowing maximum concurrent access to records.

Although a hashing technique confined to linear probing for dealing with expiring data is known and disclosed in U.S. Pat. No. 5,121,495, issued Jun. 9, 1992, and can be used to generally reduce the number of probes required to locate a record, that technique suffers from the following drawbacks: it does not limit the number of probes to a predetermined number; and it is confined strictly to linear probing and single-threading, and does not extend to other open-address collision resolution techniques or to multi-threading. Accordingly, there is a need to develop open-address hashing techniques that overcome these inadequacies.

BRIEF OVERVIEW OF THE PREFERRED EMBODIMENTS

The disclosed system implements an open-addressed hashing technique that limits the number of hash table probes to a predetermined number, and preempts a table entry slot by overwriting its stored record when necessary. In particular, during data insertion, if a suitable table slot cannot be found within a predetermined number of probes, the table slot containing the least-desirable record within probing distance of where the new record originally hashed is overwritten with the new record, thereby removing its previous occupant from the table. Similarly, during data retrieval, if the searched-for record cannot be found within the predetermined number of probes, then the record is not in the table and the operation reports back to its invoker that the retrieval procedure failed, i.e., the record was not found. Record deletion follows a similar path: if a record designated for deletion cannot be located within the predetermined number of probes, then the deletion operation reports back to its invoker that the deletion procedure failed because the record was not found.

Another feature of the system is that the predetermined number of probes within which records are stored and located, termed here the probe limit, need not be a static value. At times that the table is not being accessed, i.e., between operations, it can be increased dynamically. (It can also be decreased dynamically when the table is not being accessed, but at the risk of losing access to some records and at the risk of introducing multiple records with identical keys into the table.)

An added advantage of the system, not shared by classic open addressing, is the ability to allow maximum concurrent, multi-thread access to the table, thereby improving system throughput. Specifically, when using the linear probing collision resolution technique, only a relatively small section of the table is locked and made unavailable while a thread modifies that table section, allowing other threads complete access to the remainder of the table. Though classic open addressing, like the disclosed embodiments, permits non-modifying threads full simultaneous access to the table, all collision techniques under classic open addressing require that a modifying thread have exclusive access to the entire table, thereby barring all other threads from accessing the table while the modifying thread executes.

When using linear probing, the system described here can be combined with the on-the-fly garbage collection technique for removing expired records that is described in the aforementioned U.S. Pat. No. 5,121,495.

BRIEF DESCRIPTION OF THE DRAWING

FIG. 1, displayed as FIGS. 1A and 1B, shows a general flowchart for a record insertion operation that might be used in a hashed cache storage system;

FIG. 4, displayed as FIGS. 4A and 4B, shows a general flowchart for an alternate record deletion operation, applicable to linear probing only, that might be used in a hashed cache storage system;

DETAILED DESCRIPTION OF THE INVENTION

Figure 2:
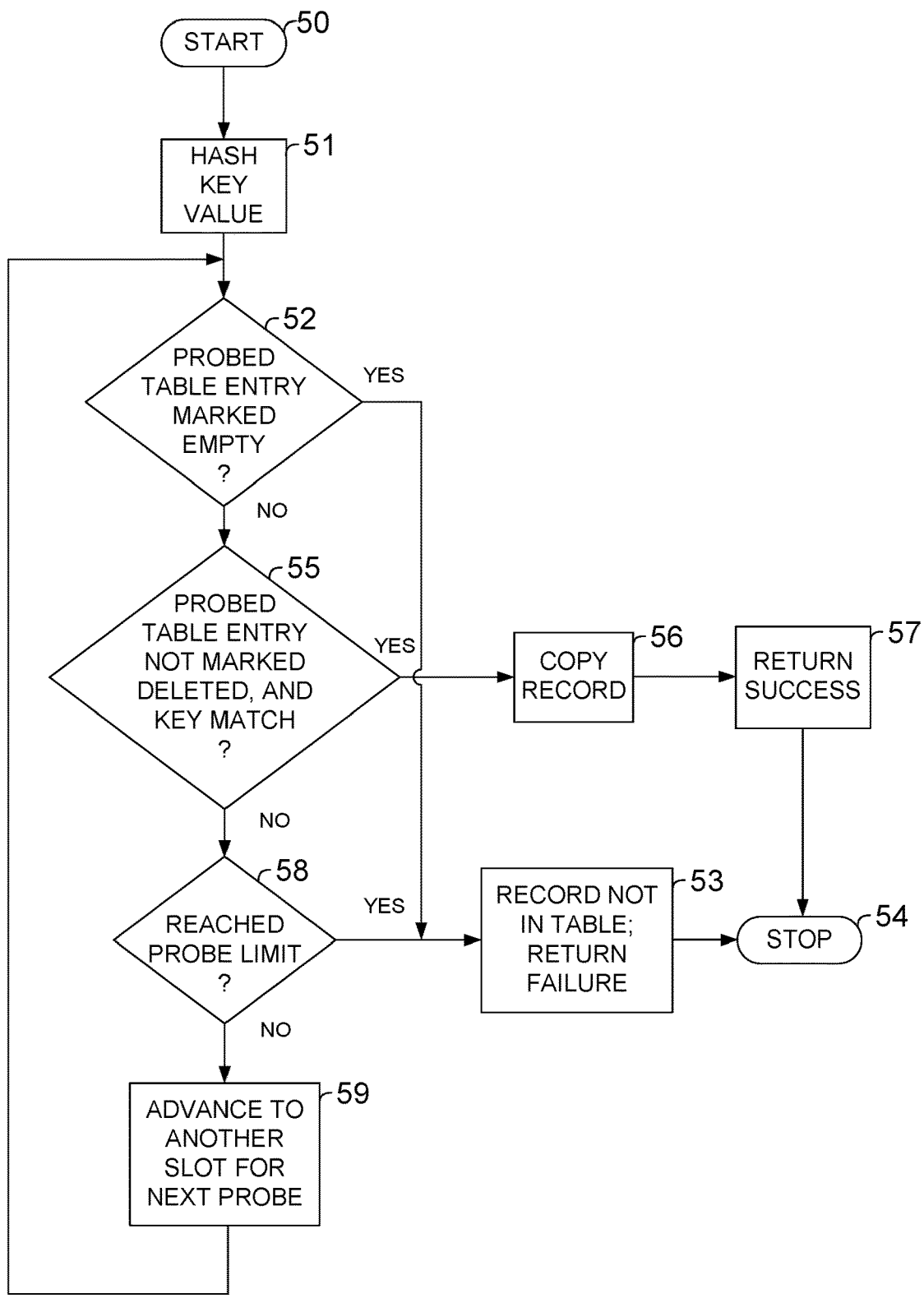
FIG. 2 shows a general flowchart for a record retrieval operation that might be used in a hashed cache storage system.

The disclosed embodiments are concerned with information storage and retrieval. The technique's preferred embodiments described herein are illustrated in the flowcharts of FIGS. 1 through 8, and shown as C-like pseudo-code in the APPENDIX below. The information storage and retrieval system of the preferred embodiments resides in the physical memory, which is electronic, of a computer system. The computer system can be virtually any type of computer or electronic computing device, including, but not limited to, a server computer, a desktop computer, a laptop computer, a notepad computer, a portable electronic device, a mobile computing device, or a distributed computing system comprised of multiple computers. The operation of the preferred embodiments is provided by a computer program that resides in the computer system's physical memory and is executed by a processor (or several processors) of the computer system. When executing, the program's instructions cause the computer system to perform specific actions and exhibit specific behavior as described below in connection with the preferred embodiments. Generally, the execution of computer software by a processor or several processors is well known in the art. Processors may be microprocessors or any other type of processors as known in the art. Physical computer memory is well known in the art and may include, for example, random access memory (RAM). As known in the art, computer memory and processors may interact and communicate information over an address/data bus. A computer system may also include well-known secondary memory data storage devices, such as hard disk drives, for example. Such devices provide extended memory for physically storing instructions and data. Computer systems typically include electronic signal generating and receiving devices for communication with other devices over computer networks as known in the art, including communications over the Internet. Such devices may provide wired and/or wireless communication functionality, and are typically supported by the software of the computer system.

It might be helpful first to understand hashing techniques in general. Many fast techniques for storing and retrieving data are known in the prior art. In situations where storage space is considered cheap compared with retrieval or computation time, a technique called hashing is often used. In classic hashing, each record in the information storage system includes a distinguished field (or collection of fields) usually unique in value to each record, called the key, which is used as the basis for storing and retrieving the associated record.

Taken as a whole, a hash table is a large, one-dimensional array of logically contiguous, consecutively numbered, fixed-size storage units. Such a table of records is typically stored in the memory of the computer, where each record is an identifiable and addressable location in physical memory. Each hash table array entry is marked 'empty,' or 'deleted,' or stores a record. The 'deleted' marking indicates that the location previously stored a record that was subsequently removed. Though both the 'empty' and 'deleted' markings indicate that the entry is vacant, for optimal system performance the 'empty' marking is favored.

A hashing function converts the key into a hash table array subscript, which is used as an index into the array where searches for the data record begin. The hashing function can be any operation on the key that results in subscripts mostly uniformly distributed across the table. Known hashing functions include truncation, folding, transposition, modulo arithmetic, and combinations of these operations. Unfortunately, hashing functions generally do not produce unique locations in the hash table, in that many distinct keys map to the same table slot, producing what are called collisions. Some form of collision resolution is required in all hashing systems. When a collision occurs, finding an alternate location for a collided record is necessary. Moreover, the alternate location must be effectively reachable during future searches for the dislocated record.

A family of oft-used collision resolution strategies, with which the present system is concerned, is called open addressing. Under open addressing, collisions are resolved by probing suitable slots of the table itself. The simplest and most common strategy of the family, linear probing, is forward probing, slot by slot, from the initial table location to the first empty location, the table being viewed circularly. A common variation of linear probing, which is a generalization of it, is to probe forward 'c' locations each time, instead of merely one, where 'c' is relatively prime to the size of the table. Other well-known strategies of the family include quadratic probing and random probing.

Single-Thread Arrangement

FIGS. 1 through 4 describe a single-thread information storage and retrieval system. FIGS. 5 through 8 describe additional program components required to implement a multi-thread information storage and retrieval system, and are described in the next section. We begin with single-threading.

Referring then to FIG. 1, displayed as FIGS. 1A and 1B, there is shown a flowchart of a record insertion operation for inserting a record into the hash table in a way that limits the number of probes required. It is applicable to all open addressing techniques. The operation repetitively probes table entries until encountering a vacant location (i.e., a slot marked 'deleted' or 'empty'), a match is found, or the probe limit is reached, whichever comes first. Starting in box 30 of the record insertion operation of FIG. 1, the key of the record being inserted is hashed in box 31 to provide the subscript of an array element, which is the first probed location. In decision box 32, the probed location is accessed to determine if it contains a record. If not, then that array slot has the marking 'deleted' or 'empty,' in which case box 33 is entered, where the new record is copied into the probed table slot. The record having been inserted, the operation reports in box 34 that the record was inserted into the information storage and retrieval system and the operation terminates in box 35.

If, as determined by decision box 32, the hash table array location indicated by the subscript generated in box 31 contains a record, then decision box 36 is entered to determine if the key of the record in the probed slot matches the key of the record to be inserted. If so, the new record is stored over the old one in box 37. The operation then reports that the old record has been replaced by the new record in box 38, after which the operation again terminates in box 35. (Optionally, though not shown in this particular embodiment, the implementer may choose to store the new record over the old one only if its score, which is described in the next paragraph in connection with box 39, is sufficiently higher than that of the old one. In the case that the new record's score does not merit replacing the old record with the new one, the operation proceeds to box 46 where it reports that the new record was not inserted, after which the operation terminates in box 35.)

If a key match has not occurred as determined by decision box 36, then box 39 is entered where a scoring computation is performed on the probed record. Though this computation varies from application to application and is particular to each one, it generally yields a quantity (or tuple of quantities) that reflect the overall worth, value, and desirability of the record under consideration. Preferably, the computed result is monotonically increasing in the informational worth of the record, i.e., a more informationally valuable record will score higher than a less valuable one. The range of outputs produced by the scoring computation should be linearly orderable since the score is used to preempt the table slot of the least desirable record when an unoccupied slot within probe-limit range of the new record's hash address is not found. Scoring computations are well known in the art, and examples include, but are not limited to, using the age of the record, based on a timestamp stored in the record, as the basis for the score, older records usually scoring lower than younger ones; in a routing cache, using the importance of a particular network transmission route, based on the importance of the source and/or destination nodes as the basis; and combinations of the above.

Once a score has been computed, decision box 40 is entered to determine if the newly computed score is lower than all previously computed scores. If so, box 41 is entered, where the score and location of the probed record are saved for possible later comparison in decision box 43 (as will be described shortly), and box 42 is entered. If the newly computed score is not lower than all previously computed scores, the operation bypasses box 41 and proceeds directly to decision box 42, which determines whether the probe limit has been reached. If that is the case, storing the new record would require preempting an occupied table slot, and so decision box 43 is entered to determine if the score of the new record is high enough to warrant overwriting an existing record. If so, box 44 is entered, where the new record is stored in the slot that was saved in box 41, as described above. The record having been inserted, the operation reports in box 34 that the record was inserted into the information storage and retrieval system and the operation then terminates in box 35. If, on the other hand, box 43 determined that the score of the new record is not high enough to warrant preempting an existing record, the operation reports in box 46 that the new record was not inserted, after which the operation once again terminates in box 35.

Returning to decision box 42, if the operation determines that the probe limit has not been reached, box 45 is entered to advance to another slot in the table for the next probe, after which the operation returns to box 32.

In FIG. 2 there is shown a flowchart of a record retrieval operation for retrieving a record from the hash table in a way that limits the number of probes made. It is applicable to all open addressing techniques. Similar to the insert operation described above, the retrieval operation repetitively probes table entries until encountering a location marked 'empty,' a match is found, or the probe limit is reached, whichever comes first. Beginning at starting box 50 of FIG. 2, the key of the record being retrieved is hashed in box 51 to provide the subscript of an array element, which is the first probed location. In decision box 52, the probed location is accessed to determine if it is marked 'empty.' If so, then the requested record is not in the table, in which case the operation reports failure, i.e., that the record could not be retrieved from the information storage and retrieval system, in box 53 and the operation terminates in box 54. If, on the other hand, decision box 52 determines that the probed entry was not marked 'empty,' decision box 55 is entered to determine if the probed slot probed slot is not marked 'deleted' and stores a record whose key matches the key of the record to be retrieved. If so, the record in the probed slot is returned to the invoker in box 56, the operation reports that it successfully retrieved the requested record from the information storage and retrieval system in box 57, and the operation terminates in box 54. If decision box 55 determines that the probed slot is marked 'deleted' or stores a record whose key does not match the key of the record to be retrieved, then decision box 58 is entered, which determines whether the probe limit has been reached. If so, the desired record is not in the table and the operation reports in box 53 that the retrieval failed, after which the operation again terminates in box 54. If decision box 58 determines that the probe limit has not been reached, box 59 is entered to advance to another slot in the table for the next probe, after which the operation returns to box 52.

Figure 3:
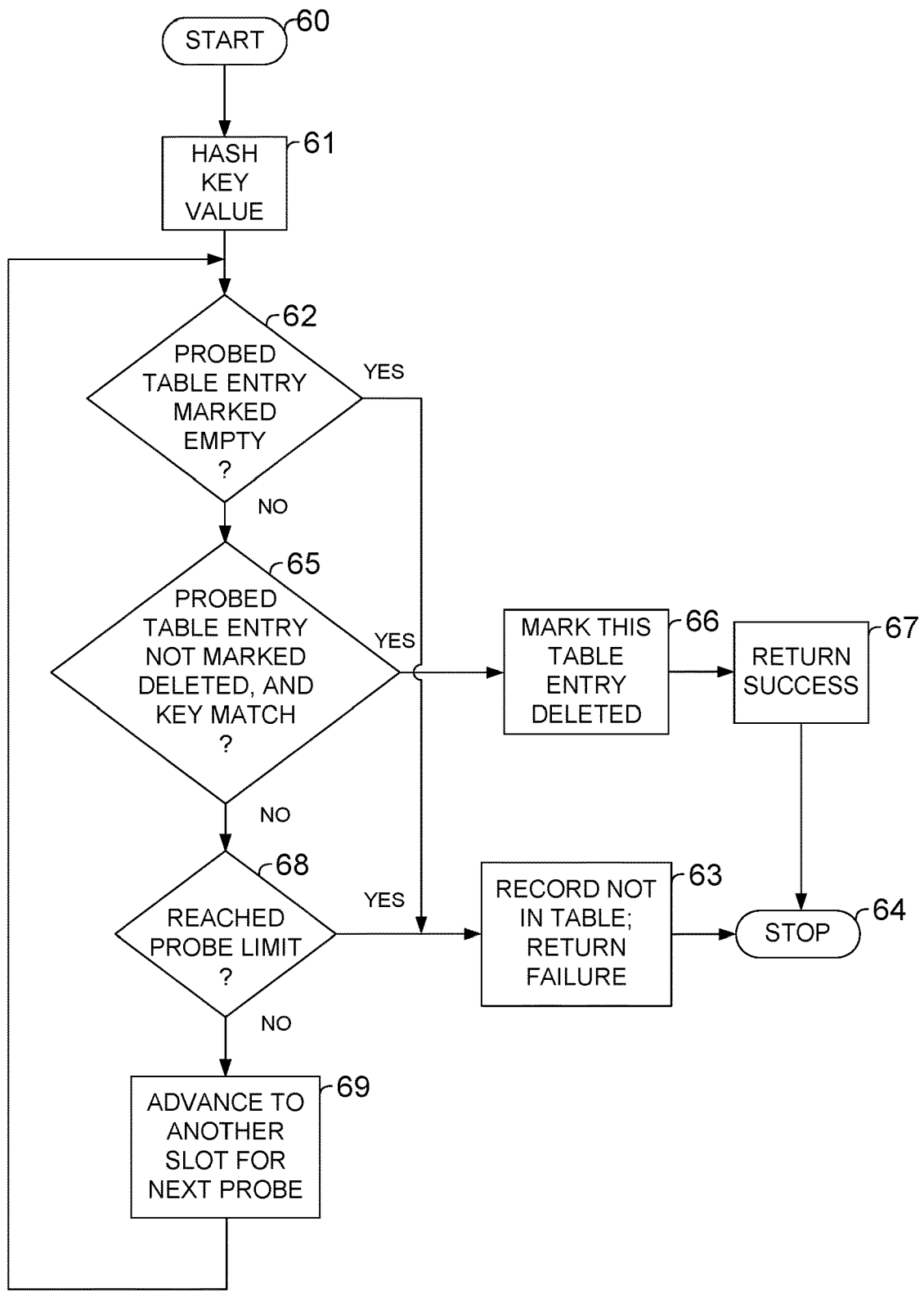
FIG. 3 shows a general flowchart for a record deletion operation that might be used in a hashed cache storage system.

In FIG. 3 there is shown a flowchart of a record deletion operation for deleting a record from the hash table by marking its slot 'deleted' in a way that limits the number of probes made. It is applicable to all open addressing techniques. Similar to the insert and retrieval operations described above, the deletion operation repetitively probes table entries until encountering a location marked 'empty,' a match is found, or the probe limit is reached, whichever comes first. Beginning at starting box 60 of FIG. 3, the key of the record being deleted is hashed in box 61 to provide the subscript of an array element, which is the first probed location. In decision box 62, the probed location is accessed to determine if it is marked 'empty.' If so, then the record is not in the table, in which case the operation reports failure, i.e., that the record could not be deleted from the information storage and retrieval system, in box 63 and the operation terminates in box 64. If, on the other hand, decision box 62 determines that the probed entry was not marked 'empty,' decision box 65 is entered to determine if the probed slot is not marked 'deleted' and stores a record whose key matches the key of the record to be deleted. If so, the record in the probed slot is marked 'deleted' in box 66, the operation reports that it successfully deleted the requested record from the information storage and retrieval system in box 67, and the operation terminates in box 64. If decision box 65 determines that the probed slot is marked 'deleted' or stores a record whose key does not match the key of the record to be deleted, then decision box 68 is entered, which determines whether the probe limit has been reached. If so, the desired record is not in the table and the operation reports in box 63 that the deletion failed, after which the operation again terminates in box 64. If decision box 68 determines that the probe limit has not been reached, box 69 is entered to advance to another slot in the table for the next probe, after which the operation returns to box 62.

In FIG. 4, displayed as FIGS. 4A and 4B, there is shown a flowchart of an alternate record deletion operation, applicable to linear probing only, for deleting a record from the hash table in a way that limits the number of probes made. It differs from the record deletion operation described in the previous paragraph in connection with FIG. 3 in that it attempts to mark the table slot 'empty,' if possible, which is more favorable than marking it 'deleted.' Though this alternate record deletion operation may take longer to complete than the one described in the preceding paragraph, it can leave the hash table in a cleaner state, one in which future table operations may complete faster. It may take longer because box 76 of FIG. 4, described below, can add up to the probe limit–1 additional probes to the operation.

The implementer has the prerogative of choosing among these two deletion strategies dynamically at the time a deletion operation is required, sometimes (or even always) deleting using the strategy shown in FIG. 3, and at other times (or even always) using the strategy shown in FIG. 4. Such a dynamic runtime decision might be based on factors such as, for example, general system load, time of day, the number of records currently residing in the table, the number of table slots currently marked 'deleted,' the number of table slots currently marked 'empty,' and other factors or combination of factors both internal and external to the information storage and retrieval system itself.

Like the deletion operation described above in connection with FIG. 3, the alternate deletion operation shown in FIG. 4 repetitively probes table entries until encountering a location marked 'empty,' a match is found, or the probe limit is reached, whichever comes first. Beginning at starting box 70 of FIG. 4, the key of the record being deleted is hashed in box 71 to provide the subscript of an array element, which is the first probed location. In decision box 72, the probed location is accessed to determine if it is marked 'empty.' If so, then the record is not in the table, in which case the operation reports failure, i.e., that the record could not be deleted from the information storage and retrieval system, in box 73 and the operation terminates in box 74. If, on the other hand, decision box 72 determines that the probed entry was not marked 'empty,' decision box 75 is entered to determine if the probed slot is not marked 'deleted' and stores a record whose key matches the key of the record to be deleted. If so, decision box 76 is entered to determine if the located record is a necessary link in a sequence of nonempty table slots, i.e., access to records stored ahead of it (circularly) would be lost by marking this slot 'empty' since an 'empty' marking terminates searches under open addressing. This decision can be made by repetitively probing successive table entries starting at the probed slot until encountering a location marked 'empty' or reaching the probe limit, either condition terminating the process and causing the operation to enter box 79; or until encountering a record to which access could be lost, in which case box 77 is entered. If box 79 is entered, the record not being a necessary link in a chain, the operation marks the probed slot 'empty' and then reports that it successfully deleted the requested record from the information storage and retrieval system in box 78, followed by termination in box 74. If box 77 is entered, the record being a necessary link in a chain, the operation marks the probed slot 'deleted,' reports that it successfully deleted the requested record from the information storage and retrieval system, and once again terminates in box 74.

Returning to decision box 75, if the determination is made that the probed slot is marked 'deleted' or stores a record whose key does not match the key of the record to be deleted, then decision box 80 is entered, which determines whether the probe limit has been reached. If so, the desired record is not in the table and the operation reports in box 73 that the deletion failed, after which the operation terminates in box 74. If decision box 80 determines that the probe limit has not been reached, box 81 is entered. This being linear probing, box 81 advances circularly to the next sequential slot in the table for the next probe, after which the operation returns to box 72.

Multi-Thread Arrangement

FIGS. 5 through 8 describe additional program components required to implement the system as a multi-thread information storage and retrieval system. The description of those components in this section depicts the preferred embodiment, which is limited to linear probing. Other embodiments may use other open addressing collision techniques.

Multi-threading, also known as multiprocessing or multitasking, refers to a form of program execution in which several concurrent computations (threads), each of which may access the information storage and retrieval system, proceed simultaneously. (Multithreading can also be implemented using coroutines.) Though simultaneous multiple retrieval operations always proceed without interference, operations that alter the information storage and retrieval system, such as insertion and deletion operations, can interfere with one another and with retrieval operations, resulting in a loss of integrity to the storage system. For that reason, an execution thread that alters any portion of the hash table must have exclusive access to that portion of the table during the operation. In what follows, we use the term modifier to denote a thread that inserts or deletes a record, and the term retriever to denote a thread that retrieves a record from the hash table. (This parallels the reader/writer terminology found in the technical literature in conjunction with the well-known "Readers-Writers Problem," where retriever corresponds to reader and modifier corresponds to writer.)

To prevent interference, concurrent thread execution must be synchronized, as is well known in the art. There are several synchronization mechanisms available, all known to be equivalent in their capacity to coordinate thread execution. These include, but are not limited to, semaphores, monitors, critical regions, spin locks, test-&-set instructions, and locks. (Though semaphores, with their well-known P and I' operations, are used as the synchronization primitive of the preferred embodiment shown in the C-like pseudocode appearing in the APPENDIX, other embodiments may use other synchronization mechanisms.)

Minimal synchronization requirements dictate that execution of a modifier thread must be temporarily suspended (blocked) if any other thread, whether it is another modifier or a retriever, is currently accessing the portion of the hash table that the modifier wishes to access. Similarly, at a minimum, execution of a retriever thread must be blocked if a modifier is currently accessing the portion of the table that the retriever wants to access. However, the synchronization provided by the preferred embodiment described here goes beyond the minimum and imposes additional restrictions to ensure that thread synchronization remain starvation-free, i.e., no thread will be perpetually blocked, a beneficial property. This comes at the expense of some concurrency. Other embodiments may synchronize differently, allowing more thread concurrency and tolerating the possibility of thread starvation. Still other embodiments may choose not to synchronize at all.

To guarantee freedom from starvation, a mechanism is required that serializes conflicting access requests by arrival time. (The preferred embodiment shown in the C-like pseudocode appearing in the APPENDIX uses a two-way list, which can, for example, be implemented, by a doubly linked list. The two-way list stores in arrival order the identity of those threads that are currently blocked. Other embodiments may serialize conflicting access requests using other mechanisms, such as timestamps or integer sequencers, for example.) Other embodiments may choose not to serialize requests.

In performing an operation on the hash table, a thread can reference up to potentially the probe limit number of circularly consecutive table slots—the alternate deletion operation can reference up to 2·probe limit−1 slots—starting at the slot to which the hashing function maps the key. A modifier thread must have exclusive access to that range of circularly sequential slots, called the lock range. Consequently, two threads do not conflict unless their lock ranges overlap. (The preferred embodiment shown in the C-like pseudocode appearing in the APPENDIX includes a function called "conflict" that determines if two lock ranges overlap. Other embodiments may choose to determine if two threads' lock ranges overlap in other ways.)

To enforce proper synchronization, all threads wishing to access the hash table must adhere to a common protocol, consisting of the following: 1.) A modifier wishing access to the table must invoke synchronizing software (depicted in FIG. 5, and shown as the "modify request" function in the C-like pseudocode found in the APPENDIX) following invocation of the hashing function and prior to accessing table entries to perform its operation; 2.) Similarly, a retriever wishing access to the table must invoke synchronizing software (depicted in FIG. 6, and shown as the "retrieve request" function in the C-like pseudocode found in the APPENDIX) following invocation of the hashing function and prior to accessing table entries to perform its operation; 3.) A modifier that has completed its operation must invoke synchronizing software (depicted in FIG. 7, and shown as the "modify done" function in the C-like pseudocode found in the APPENDIX) before returning control to its invoker; and 4.) A retriever that has completed its operation must invoke synchronizing software (depicted in FIG. 6, and shown as the "retrieve done" function in the C-like pseudocode found in the APPENDIX) before returning control to its invoker. All blocking and unblocking of threads is handled by the synchronizing software shown in FIGS. 5 through 8.

Figure 5:
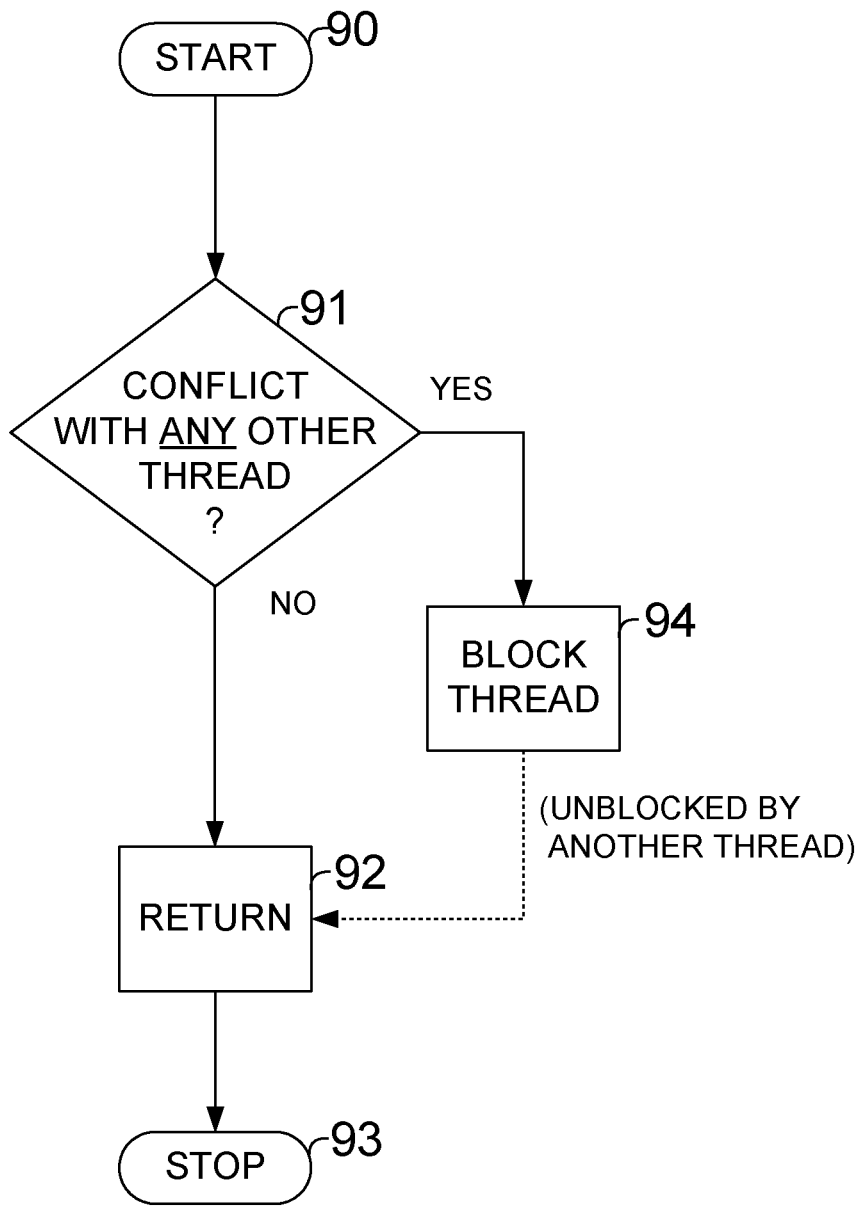
FIG. 5 shows a general flowchart for a modify request operation, applicable to linear probing only, that might be used in a multi-thread hashed cache storage system.

Referring then to FIG. 5, there is shown a flowchart of a modify request operation, applicable to linear probing only, for accepting a request from a modifier thread to access the hash table in a way that synchronizes the threads to avoid interference. Starting in box 90 of FIG. 5, the operation determines in decision box 91 whether the invoking modifier thread conflicts with any other thread, decided by lock-range overlap. If not, then box 92 is entered to return control back to the invoker for immediate completion of the modify operation, followed by termination of the modify request operation in box 93. If decision box 91 determines that the invoking modifier conflicts with another thread, then the invoking thread's execution is temporarily blocked, to be unblocked at the appropriate time in the future (signified by the dashed line connecting box 94 to 92) when it no longer conflicts with other threads. At that time, it will enter box 92 to return control back to the invoker for completion of the modify operation, followed again by termination of the modify request operation in box 93.

Figure 6:
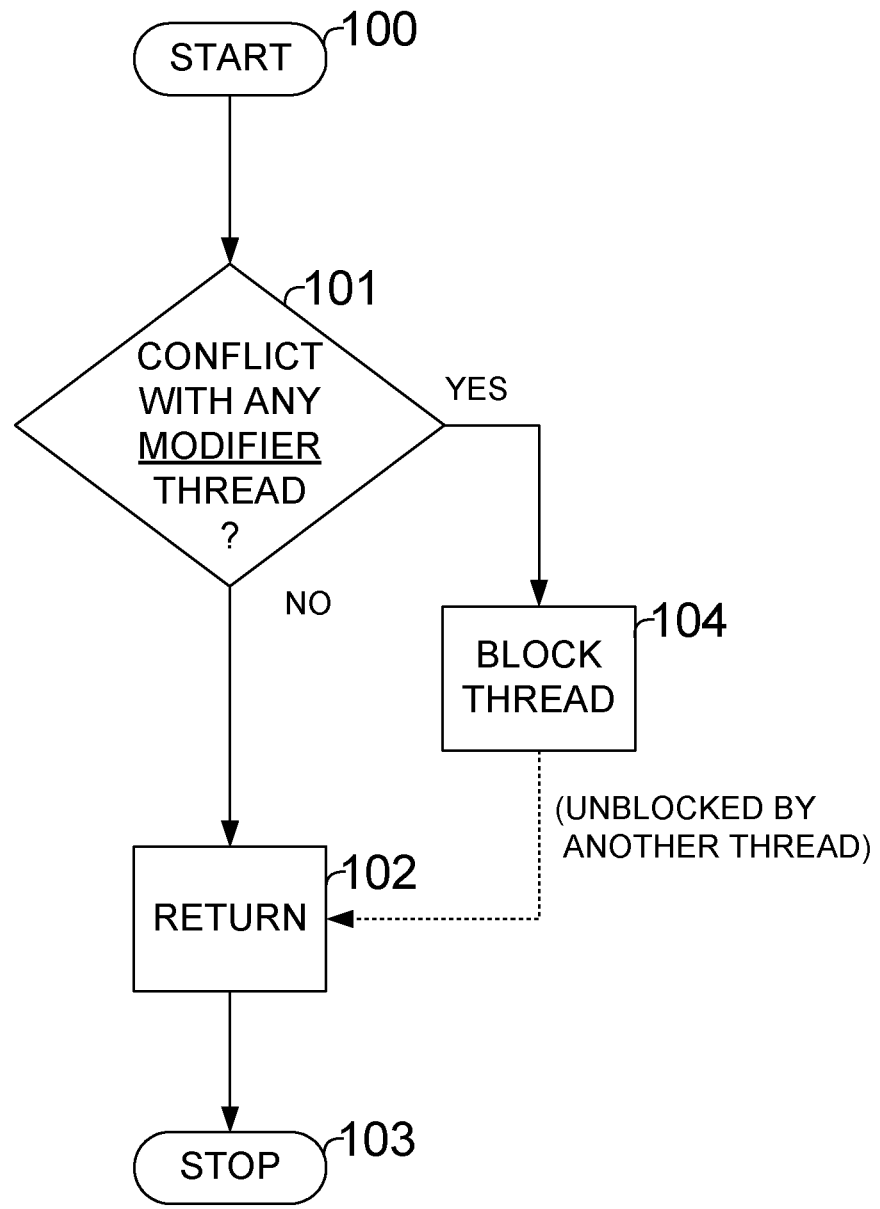
FIG. 6 shows a general flowchart for a retrieve request operation, applicable to linear probing only, that might be used in a multi-thread hashed cache storage system.

In FIG. 6 there is shown a flowchart of a retrieve request operation, applicable to linear probing only, for accepting a request from a retriever thread to access the hash table in a way that synchronizes the threads to avoid interference. Starting in box 100 of FIG. 6, the operation determines in decision box 101 whether the invoking retriever thread conflicts with any modifier threads, decided by lock-range overlap. If not, then box 102 is entered to return control back to the invoker for immediate completion of the retrieval operation, followed by termination of the retrieve request operation in box 103. If decision box 101 determines that the invoking retriever conflicts with any modifiers, then the invoking thread's execution is temporarily blocked, to be unblocked at the appropriate time in the future (signified by the dashed line connecting box 104 to 102) when it no longer conflicts with any modifiers. At that time, it will enter box 102 to return control back to the invoker for completion of the retrieval operation, followed again by termination of the retrieve request operation in box 103.

Figure 7:
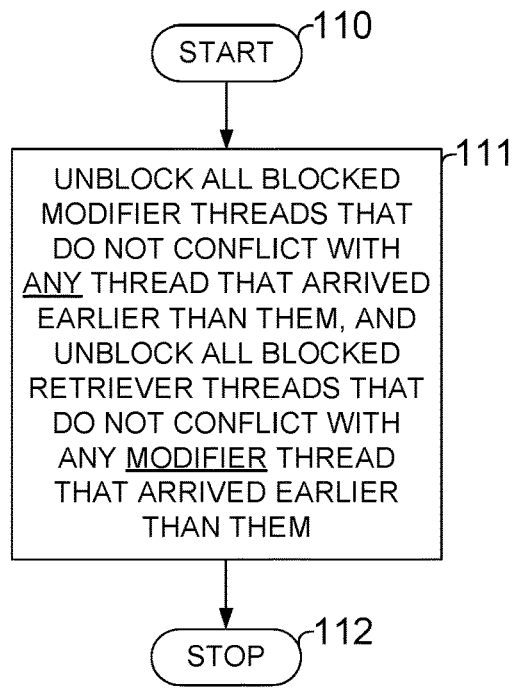
FIG. 7 shows a general flowchart for a modify done operation, applicable to linear probing only, that might be used in a multi-thread hashed cache storage system.

In FIG. 7 there is shown a flowchart of a modify done operation, applicable to linear probing only, for accepting notification from a modifier thread that it has completed accessing the hash table in a way that synchronizes the threads to avoid interference. Starting in box 110 of FIG. 7, now that there is one fewer active modifier thread, box 111 unblocks all blocked modifier threads that do not conflict with any thread that arrived earlier than them, whether modifier or retriever, and it unblocks all blocked retriever threads that do not conflict with any active or waiting modifier that arrived earlier than them. Box 112 is then entered where the modify done operation terminates.

Figure 8:
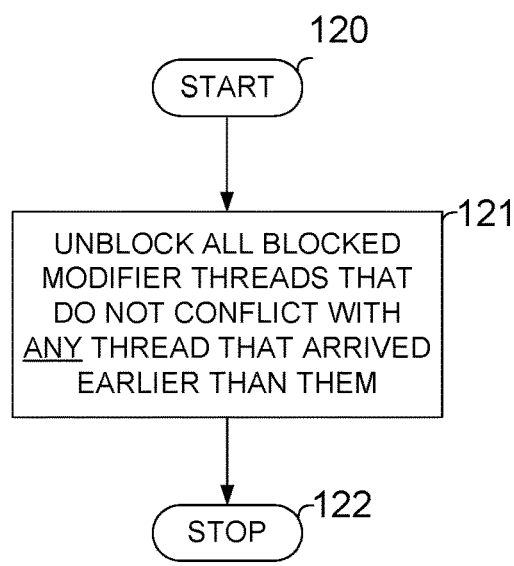
FIG. 8 shows a general flowchart for a retrieve done operation, applicable to linear probing only, that might be used in a multi-thread hashed cache storage system.

In FIG. 8 there is shown a flowchart of a retrieve done operation, applicable to linear probing only, for accepting notification from a retriever thread that it has completed accessing the hash table in a way that synchronizes the threads to avoid interference. Starting in box 120 of FIG. 8, box 121 unblocks all blocked modifier threads that do not conflict with any thread that arrived earlier than them, whether modifier or retriever. (Unlike the modify done operation of FIG. 7, it does not unblock waiting retriever threads because retrievers can never be blocked waiting on other retrievers, even if their lock ranges overlap.) Box 122 is then entered where the retrieve done operation terminates.

Irrespective of whether the present invention is deployed in a single-thread or multi-thread arrangement, it can be combined with a stand-alone program or background process or coroutine (or parallel thread, or collection of background processes, or collection of parallel threads, or collection of coroutines, or combinations of these) that sweep the table (or portions of it) and attempt to convert slots marked 'deleted' to 'empty' using the walk-ahead technique as described in connection with the alternate record deletion operation shown in FIG. 4. Instead, a technique based on the procedure shown on page 527 of the aforementioned text by Knuth that guarantees that 'deleted' markings will be eliminated could be used, though that technique will not be probe-limited. All these techniques could require introducing additional synchronization using an appropriate synchronization primitive, such as semaphores, for example.

Determining System Parameter Values

The size of the hash table can be chosen using the general rule that a hash table should not be more than about half full, i.e., it should contain twice as many slots as the maximum number of records that will be stored in it. If that is the case, most accesses can be done within three probes. If using an effectively uniform hashing function in a single-thread arrangement, the default value of the probe limit should be set so that the vast majority of records are accessible, while at the same time protecting the table from a carefully constructed DOS attack. That value is 20. (Setting the probe limit to the size of the table effectively disables restricting the number of probes.)

In a multi-thread arrangement, parameter values should be chosen so that it is very unlikely that a thread must be blocked, and that finding multiple threads in the blocked state simultaneously is extremely rare. The likelihood of having to block a thread depends on the probability that its lock range overlaps that of another thread, which in turn depends on the uniformity of the hashing function, the size of the table, the probe limit, and the number of concurrent threads. (Large table size, small probe limit, and few threads lead to few conflicts.) It also depends on the proportion of threads that are modifiers. (Few modifiers lead to few conflicts.) Though the number of modifiers is relatively high during the early stages in the life of a cache, the share of modifiers is usually small once the cache has matured and the system is in steady state.

If using the record deletion operation shown in FIG. 3 exclusively to delete records, and assuming hashing function uniformity, then bounds on the probability that a collection of concurrent threads are conflict-free are given by $$\prod_{i=2}^{\#of\,threads}\left(1 - \frac{(2 \cdot \text{probe limit} - 1) \cdot (i-1) \cdot m \cdot (2-m)}{\text{table size}}\right) \leq$$

-continued $$Prob(\text{no conflict}) \leq \prod_{i=2}^{\#of\,threads}\left(1 - \frac{(i \cdot \text{probe limit} - 1) \cdot m \cdot (2-m)}{\text{table size}}\right),$$

where $m$ is the fraction of threads that modify. (When using alternate deletion shown in FIG. 4 exclusively, replace "probe limit" above by "2·probe limit−1".)

Using the value for the table size described above, these bounds can be used by the implementer to choose the probe limit and number of threads so that the expected thread blocking rate is acceptable, which is assured if $$\frac{\text{number of threads} \cdot \text{probe limit}}{\text{table size}}$$

is kept small. For example, if no more than 1,000,000 records will be stored in the table (in which case the table size is 2,000,000) and the probe limit is 20 and there are 15 threads, 20% of which are modifiers, then the probability that a thread blocks is less than 0.1%.

All values indicated above can be tailored by the implementer to fit the particular operating environment in which the information storage and retrieval system will be deployed and the particular application for which it is used.

The attached APPENDIX contains C-like pseudocode for all program components needed to implement an information storage and retrieval system operating in accordance with the present invention. Any person of ordinary skill in the art will have no difficulty implementing the disclosed system and functions shown in the APPENDIX, including programs for all common hardware and system software arrangements, on the basis of this description, including flowcharts and information shown in the APPENDIX.

It should also be clear to those skilled in the art that other embodiments of the present invention may be made by those skilled in the art without departing from the teachings of the present invention. It is also clear to those skilled in the art that the invention can be used in diverse computer applications, that it is not limited to information caching or hashing or denial-of-service algorithmic complexity attack amelioration, and that it is broadly applicable to techniques involving open-address hashing in particular and array storage in general.

APPENDIX

Functions Provided

The following functions are made available to client programs:

1. insert_return_type insert (record_type*record)
    Returns REPLACED if a record associated with record→key was found and subsequently replaced.
    Returns INSERTED if a record associated with record→key was not found and the passed record was subsequently inserted.
    Returns NOT-INSERTED if a record associated with record→key was not found and the passed record was not inserted.
2. failure_success_type retrieve (record_type*record)
    Returns SUCCESS if record associated with record→key was found and assigned to *record.
    Returns FAILURE if search was unsuccessful.
3. delete_return_type delete (record_key_type* record_key)
    Returns SUCCESS if record associated with *record_key was found and subsequently deleted from the cache.
    Returns FAILURE if not found.

1. #define TABLE_SIZE  /* Size of hash table. */
2. #define DEFAULT_PROBE_LIMIT  /* 0 < DEFAULT_PROBE_LIMIT ≤ TABLE_SIZE; default maximum */
   /* number of probes per record access. */
3. #define MAX_SCORE  /* score < MAX_SCORE. */
4. typedef enum {REPLACED, INSERTED, NOT_INSERTED} insert_return_type;
   /* Return value type of insert. */
5. typedef enum {FAILURE, SUCCESS} failure_success_type;
   /* Return value type of retrieve and delete. */
6. record_type table[TABLE_SIZE];  /* Hash table; each slot is marked empty or deleted, or stores a record. */
   Initial state of table: table[i] is empty $\forall i \; 0 \leq i <$ TABLE_SIZE  /* Entire table is empty. */

7. int probe_limit = DEFAULT_PROBE_LIMIT;  /* 0 < probe_limit ≤ TABLE_SIZE; accessing any record */
   /* requires no more than this number of probes; it can be */
   /* dynamically increased safely (but not decreased safely). */

In addition to the definitions shown above, the following formal global definitions are required for the multi-thread versions of the insertion, retrieval, and deletion functions, which are specified below.

8. Both probe_limit and DEFAULT_PROBE_LIMIT must be $\leq \left\lceil \dfrac{\text{TABLE\_SIZE}}{2} \right\rceil$ if alternate version of delete function is used.

9. #define MAX_NUMBER_OF_THREADS  /* Maximum number of concurrent threads that share table. */
10. typedef enum {INACTIVE, MODIFYING, RETRIEVING, WAITING_TO_MODIFY,
    WAITING_TO_RETRIEVE} thread_execution_state;  /* Thread execution states. */
11. typedef struct {
        int start;  /* Index in table of start of range of cells that are locked by thread. */
        int end;  /* Index in table of end of range of cells that are locked by thread. */
    } lock_range_type;  /* Thread needs exclusive access to all cells in [start, end]. */
12. typedef struct {
        thread_execution_state state;  /* Thread's current execution state. */
        lock_range_type lock_range;  /* Thread's lock range. */
    } thread_state;
13. int thread_number;  /* 0 ≤ thread_number < MAX_NUMBER_OF_THREADS; */
    /* Each thread has access to its own unique thread number. */
14. thread_state thread[MAX_NUMBER_OF_THREADS];  /* Tracks the state of all execution threads. */
    Initial state of thread: thread[i].state = INACTIVE $\forall i \; 0 \leq i <$ MAX_NUMBER_OF_THREADS
    /* No thread active. */
15. Two-way linear list;  /* Serializes conflicting access requests to table by arrival time, thereby preventing */
    /* thread starvation. (Can be implemented, for example, by a doubly linked list.) */
16. semaphore mutex = 1;  /* Ensures mutually exclusive access to thread array and two-way linear list. */
17. semaphore s[MAX_NUMBER_OF_THREADS];  /* s[i] is used to block execution of thread[i]. */
    Initial state of s: s[i] = 0 $\forall i \; 0 \leq i <$ MAX_NUMBER_OF_THREADS  /* No thread blocked. */

```
insert_return_type insert (record_type *record)
{
    int f = hash (&record→key), i = f; /* hash returns a value between 0 and TABLE_SIZE − 1, inclusive. */
    score_type lowest_score = MAX_SCORE;            /* Lowest score encountered thus far. */
    int lowest_scored_slot;             /* Index of slot with the lowest score encountered thus far. */
    int probe_count = 0;                            /* Tracks number of probes done so far. */
    for ( ; ; ) /* Traverse table entries using i until reach a vacant location, match is found, or hit probe limit */
    {
        score_types; /* Used to temporarily save record's score to avoid possibly costly recomputation. */
        if (table[i] is deleted || table[i] is empty)
        {                       /* First deleted or empty slot encountered always gets new record. */
            table[i] = *record;
            return (INSERTED);
        }
        if (table[i].key == record→ key)                /* Matched record? */
        {
            table[i] = *record;             /* Yes; store new record over old one. */
            return (REPLACED);
        }
        s = score (table + i);    /* Save record's score for possible assignment to lowest_score below. */
        if (s < lowest_score)            /* Is this record's score lowest one found thus far? */
        {                                /* Yes, remember its score and its location. */
            lowest_score = s;
            lowest_scored_slot = i;
        }
        if (++probe_count == probe_limit)                       /* Hit probe limit? */
```

-continued

```
            if (score (record) > lowest_score) /* Yes; is new record's score lower than one in saved slot? */
                {                              /* Yes, preempt slot holding lowest scored record. */
                    table[lowest_scored_slot] = *record;
                    return (INSERTED);
                }
            else                               /* No; can't insert record at this time. */
                return (NOT_INSERTED);
            i = next_probe(f, i, probe_count);    /* No; advance to another slot in hash table for next probe. */
        }                                         /* End of body of for loop. */
}                                             /* end insert */
```

Retrieve Function

```
failure_success_type retrieve (record_type *record)
    {
        int f = hash (&record→ key), i = f;    /* hash returns a value between 0 and TABLE_SIZE − 1, inclusive. */
        int probe_count = 0;                   /* Tracks number of probes done so far. */
        for ( ; ; ) /* Traverse table entries using i until reach an empty location, match is found, or hit probe limit */
            {
                if (table[i] is empty)                     /* Reached empty slot, so record is not in table. */
                    return (FAILURE);
                if (table[i] is not deleted && table[i].key == *record_key)         /* Found match? */
                    {
                        *record = table[i];                /* Yes, return record with matching key to caller. */
                        return (SUCCESS);
                    }
                if (++probe_count == probe_limit)                                    /* Hit probe limit? */
                    return (FAILURE);                                                /* Yes, record is not in table. */
                i = next_probe(f, i, probe_count);    /* No, advance to another slot in hash table for next probe. */
            }                                                                        /* End of body of for loop. */
}                                                 /* end retrieve */
```

Delete Function

```
failure_success_type delete (record_key_type *record_key)
    {
        int f = hash (record_key), i =f,      /* hash returns a value between 0
                                                 and TABLE_SIZE − 1, inclusive. */
        int probe_count = 0;                  /* Tracks number of probes done so far. */
        for ( ; ; ) /* Traverse table entries using i until reach an empty location, match is found, or hit
                      probe limit. */
            {
                if (table[i] is empty) /* Reached empty slot, so record is not in table and therefore can't
                                          be deleted. */
                    return (FAILURE);
                if (table[i] is not deleted && table [i].key == * record_key)        /* Found match? */
                    {/*                                    Yes, found the record; now mark its slot in table
                                                            deleted. */
                        mark table[i] deleted;
                        return (SUCCESS);
                    }
                if (++probe_count == probe_limit)                                    /* Hit probe limit? */
                    return (FAILURE);         /* Yes, record is not in table and therefore can't be
                                                 deleted. */
                i = next probe (f, i, probe count);   /* No, advance to another slot in hash table for next
                                                         probe. */
            }                                         /* End of body of for loop. */
}                                             /* end delete */
```

Alternate Version of Delete Function (Applicable to Linear Probing Only)

| Alternate Version of Delete Function (Applicable to Linear Probing only) |
|---|
| ```
failure_success_type delete (record_key_type *record_key)
{
    /* SAME AS VERSION SHOWN ABOVE EXCEPT THAT AN ATTEMPT IS MADE TO MARK
       THE TABLE SLOT EMPTY, IF POSSIBLE, WHICH IS MORE FAVORABLE THAN
       MARKING IT DELETED. */
    int f = hash (record_key), i = f,              /* hash returns a value between 0 and TABLE_SIZE - 1, inclusive. */
    int probe_count = 0;                            /* Tracks number of probes done so far. */
    for ( ; ; )           /* Traverse table entries using i until reach an empty location, match is found, or hit probe limit. */
    {
        if (table[i] is empty)                      /* Reached empty slot, so record is not in table and therefore can't be deleted. */
            return (FAILURE);
        if (table[i] is not deleted && table [i].key = = *record_key)                         /* Found match? */
        {                                           /* Yes; now mark its slot in table deleted or empty (favored). */
            for (int j = 1; j < probe_limit && table[(i + j) % TABLE_SIZE] is not empty; j++)
                if (table[(i + j) % TABLE_SIZE] is not deleted)
                {                                   /* See if record in slot i + j hashes at or before slot i. */
                    int g = (i + j) % TABLE_SIZE;   /* Its current position. */
                    int h = hash (&table[g].key);   /* Its original hash position. */
                    if (h ≤ i < g || i < g < h || g < h ≤ i)                              /* Does it hash at or before slot i? */
                    {
                        mark table[i] deleted;      /* Yes, can't mark slot empty; instead, mark it deleted. */
                        return (SUCCESS);
                    }
                }
            mark table[i] empty;                    /* Can mark slot empty, which is the more favorable marking. */
            return (SUCCESS);
        }                                           /* End of "if (table[i] is not deleted && table[i].key = = *record_key)." */
        if (++probe_count = = probe_limit)                                              /* Hit probe limit? */
            return (FAILURE);                       /* Yes, record is not in table and therefore can't be deleted. */
        i = next_probe (f, i, probe_count);         /* No, advance to another slot in hash table for next probe. */
    }                                               /* End of body of for loop. */
}                                                   /* end delete */
``` |

Next Probe Function

| |
|---|
| ```
int next_probe (int f, int i, int probe_count)
{
    /* Returns the next slot in table to probe, based on the index of the first probe (f),
       index of the current probe (i), the number of probes done thus far (probe_count),
       and the collision resolution technique that is used. */
    Linear probing            return ((i + 1) % TABLE_SIZE);
    Linear probing variation  return ((i + c) % TABLE_SIZE);  /* c relatively prime
                              to TABLE_SIZE. */
    Quadratic probing         return ((f + probe_count²) % TABLE_SIZE);
    Random probing            srand (i); return (rand ( ) % TABLE_SIZE);
}                             /* end next_probe */
``` |

Score Function

| |
|---|
| ```
score_type score(record_type * record)
{
    /* Returns a value strictly < MAX_SCORE. Its returned value is monotonically increasing in the
       informational worth of its argument. */
    return (record → timestamp);                    /* For example. */
}                             /* end score */
``` |

Multi-Thread Version of Insert Function (Applicable to Linear Probing Only)

| |
|---|
| ```
insert_return_type insert (record_type *record)
{
    int f = hash (&record→ key), i = f, /* hash returns a value between 0 and TABLE_SIZE - 1, inclusive. */
    modify_request(thread_number, f, (f + probe_limit - 1) % table_size);      /* Avoids conflicts. */
    score_type lowest_score = MAX_SCORE;            /* Lowest score encountered thus far. */
             .                                      /* Same as insert function shown above, except */
``` |

-continued

```
                              .          /* that "modify_done(threacl_number);"call */
                              .          /* immediately precedes each "return"statement. */
}                                        /* end insert */
```

Multi-Thread Version of Retrieve Function
(Applicable to Linear Probing Only)

Multi-Thread Version of Retrieve Function (Applicable to Linear Probing only)

```
failure_success type retrieve (record_type *record)
{
    int f = hash (&record→key), i = f,  /* hash returns a value between 0 and TABLE_SIZE − 1, inclusive. */
    retrieve_request (thread_number, f, (f + probe_limit −1) % table_size); /* Avoids conflicts. */
    int probe_count = 0;                            /* Tracks number of probes done so far. */
                              .          /* Same as retrieve function shown above, except */
                              .          /* that "retrieve_done (thread_number);" call */
                              .          /* immediately precedes each "return" statement. */
}                                                                          /* end retrieve */
```

Multi-Thread Versions of Delete Function and
Alternate Delete Function (Applicable to Linear
Probing Only)

```
failure_success_type delete(record_key_type *record_key)
{
    int f = hash (record_key), i = f;   /* hash returns a value between 0 and TABLE_SIZE − 1, inclusive. */
    modify_request(thread_number, f, (f + probe_limit − 1) % table_size);         /* Avoids conflicts. */
    ( . . . . . . . . . . . . . . . . . . . . (f + 2* probe_limit − 2) . . .      /* Alternate version delete. */)
    int probe_count = 0;                              /* Tracks number of probes done so far. */
                              .          /* Same as delete functions shown above, except */
                              .          /* that "modify_done(thread_number);" call */
                              .          /* immediately precedes each "return" statement. */
}                                        /* end delete */
```

Modify Request Function (Applicable to Linear
Probing Only)

```
void modify_request (int thread_number, int lock_range_start, int lock_range_end)
{
    /* Returns immediately if caller, which is a modifier, doesn't conflict with another thread;
       otherwise, temporarily blocks caller thread, which will be unblocked by another thread at the
       appropriate time in the future. */
    P(mutex);         /* Wait until we have exclusive access to thread array and two-way linear list. */
    thread[thread_number].lock_range.start = lock_range_start;        /* Save thread's lock range */
    thread[thread_number].lock_range.end = lock_range_end,            /* in its associated array entry. */
    for (int i = 0; i < MAX_NUMBER_OF_THREADS, i++) /* Traverse thread, looking for conflicts. */
        if (thread[i].state! = INACTIVE && conflict (lock_range_start,
                                                     lock_range_end,
                                                     thread[i].lock_range.start,
                                                     thread[i].lock_range.end))       /* Conflict? */
        {                                         /* Yes, thread must wait, so block its execution. */
            thread[thread_number].state = WAITING_TO_MODIFY;
            insert thread_number at the end of two-way linear list;
            V(mutex);         /* Release exclusive access to thread array and two-way linear list. */
            P(s[thread_number]);      /* Block this thread until it doesn't conflict with earlier threads. */
            return;           /* Go and modify table only when unblocked later by another thread. */
        }
    thread[thread_number].state = MODIFYING;         /* No conflicts; can modify tablenow. */
    V(mutex);            /* Release exclusive access to thread array and two-way linear list. */
    return;                                          /* Go and modify table immediately. */
}                                                    /* end modify_request */
```

Retrieve Request Function (Applicable to Linear Probing Only)

```
void retrieve_request(int thread_number, int lock_range_start, int lock_range_end)
{
    /* Returns immediately if caller, which is a retriever, doesn't conflict with a modifier thread;
       otherwise, temporarily blocks caller thread, which will be unblocked by a modifier thread at the
       appropriate time in the future. */
    P(mutex);                       /* Wait until we have exclusive access to thread array and two-way linear list. */
    thread[thread_number].lock_range.start = lock_range_start;        /* Save thread's lock range */
    thread[thread_number].lock_range.end = lock_range_end,            /* in its associated array entry. */
    for (int i = 0; i < MAX_NUMBER_OF_THREADS, i++) /* Traverse thread, looking for conflicts. */
        if ((thread[i].state == MODIFYING || thread[i].state == WAITING_TO_MODIFY)&&
            conflict (lock_range_start,
            lock_range_end,
            thread[i].lock_range.start,
            thread[i].lock_range.end))                                /* Conflict? */
            {                                      /* Yes, thread must wait, so block its execution. */
            thread[thread_number].state =WAITING_TO_RETRIEVE;
            insert thread_number at the end of two-way linear list;
            V(mutex);               /* Release exclusive access to thread array and two-way linear list. */
            P(s[thread_number]);    /* Block this thread until it doesn't conflict with earlier modifiers. */
            return;         /* Go and retrieve from table only when unblocked later by a modifier thread. */
            }
    thread[thread_number].state = RETRIEVING;       /* No conflicts; can retrieve from table now. */
    V(mutex);                       /* Release exclusive access to thread array and two-way linear list. */
    return;                                          /* Go and retrieve from table immediately. */
}                                                    /* end retrieve_request */
```

Modify Done Function (Applicable to Linear Probing Only)

```
void modify_done(int thread_number)
{
    /* Now that there is one fewer active retriever thread, unblock all blocked modifier threads that do
       not conflict with any thread, active or waiting, that arrived earlier than them. Unblock all
       blockeed retriever threads that do not conflict with any active modifier thread or with any
       waiting modifier thread that arrived earlier than them. */
    P(mutex);       /* Wait until we have exclusive access to thread array and two-way linear list. */
    thread[thread_number].state = INACTIVE;         /* Thread has finished retrieving from table. */
    for (each element i of the two-way linear list)     /* Traverse list to find threads to unblock. */
        if (thread[element$_i$].state == WAITING_TO_MODIFY
        {
            if (thread [element$_i$] does not conflict with any thread whose state == RETRIEVING
                or whose state == MODIFYING && thread[element$_i$]does not conflict with any
                thread in front of it in the two-way linear list)
            {
                thread[element$_i$].state = MODIFYING;
                V(s[element$_i$]);          /* Unblock this waiting modifier so it can modify table. */
                remove element; from the two-way linear list;
            }                    /* end "if (thread[element$_i$]does not conflict with any thread ...". */
        }                        /* end "if (thread[element$_i$].state == WAITING_TO_MODIFY". */
        else if (thread[element$_i$] does not conflict with any thread whose state == MODIFYING
            && thread[element$_i$]does not conflict with any thread in front of it in the
            two-way linear list whose state == WAITING_TO_MODIFY)
        {
            thread[element$_i$].state = RETRIEVING;
            V(s[element$_i$]);          /* Unblock this waiting retriever so it can retrieve from table. */
            remove element$_i$ from the two-way linear list;
        }
    V(mutex);                /* Release exclusive access to thread array and two-way linear list. */
    return;
}
```

Retrieve Done Function (Applicable to Linear Probing Only)

```
void retrieve_done(int thread_number)
{
    /* Now that there is one fewer active retriever thread, unblock all blocked modifier threads that do
       not conflict with any thread, active or waiting, that arrived earlier than them. */
    P(mutex);       /* Wait until we have exclusive access to thread array and two-way linear list. */
    thread[thread_number].state = INACTIVE;      /* Thread has finished retrieving from table. */
    for (each element i of the two-way linear list)     /* Traverse list to find threads to unblock. */
```

-continued

```
   if (thread[element_i].state == WAITING_TO_MODIFY &&
      thread[element_i]does not conflict with any thread whose state == RETRIEVING
      or whose state == MODIFYING && thread[element_i]does not conflict with any
      thread in front of it in the two-way linear list)
   {
      thread[element_i].state = MODIFYING;
      V(s[element_i]);              /* Unblock this waiting modifier so it can modify table. */
      remove element_i from the two-way linear list;
   }
   V(mutex);           /* Release exclusive access to thread array and two-way linear list. */
   return;
}                                   /* end retrieve_done*/
```

Conflict Function (Applicable to Linear Probing Only)

```
boolean conflict (int s_1, int e_1, int s_2, int e_2)
{
   /* Returns 'true' if [s_1, e_1] ∩ [s_2, e_2] ≠ ∅, i.e., the two lock-range intervals (viewed circularly)
      overlap; otherwise returns 'false.' */
   return (!(s_1 ≤ e_1 < s_2 ≤ e_2 || < s_2 ≤ e_2 < s_1 ≤ e_1 || e_1 < s_2 ≤ e_2 < s_1 || e_2 < s_1 ≤ e_1 < s_2));
}                                   /* end conflict */
```

We claim:

1. An information storage and retrieval system, the system comprising:
   a hash table comprised of slots residing in a physical memory of a computer with multi-threading capability,
   means for providing access to data records stored in the hash table using a hashing function that maps search key data values to slots and using open addressing to store the records with a same hash address,
   means for identifying an initial slot using the hashing function applied to a search key data value,
   means for determining whether there is a collision, which occurs when the initial slot contains a data record that lacks a key field value matching the search key value,
   means for probing additional slots in the case of the collision to find a data record whose key field value matches the search key value, or an empty slot, whichever comes first, where the number of such additional slots is at least one, and fewer than a predetermined limited number of slots, where the predetermined limited number of slots is more than one and fewer than a number of slots comprising the hash table, wherein the predetermined limited number of slots is dynamically decreased, thereby relinquishing access to those records that cannot be reached within the decreased predetermined limited number of additional slots, and wherein limiting the number of additional slots enables at least one executing thread among concurrent threads accessing the hash table to execute without conflict from threads that alter slots of the hash table.

2. The information storage and retrieval system according to claim 1 where the predetermined limited number of slots is dynamically decreased by one.

3. The information storage and retrieval system according to claim 1 where the predetermined limited number of slots is dynamically decreased by more than one and not more than ten.

4. The information storage and retrieval system according to claim 1 where the predetermined limited number of slots is dynamically decreased by more than ten.

5. The information storage and retrieval system according to claim 1 wherein the value of the dynamically decreased predetermined limited number of slots is at least one after the decrease.

6. The information storage and retrieval system according to claim 1 further including added means for probing additional slots in the case of the collision to find a slot into which a data record can be inserted, where the number of such additional slots is at least one, and fewer than the predetermined limited number of slots, and forgoing insertion if the slot is not found.

7. The information storage and retrieval system according to claim 1 wherein a slot into which a record is inserted is a slot where no data record is stored or that contains a data record whose score is not superior to a score of the data record to be inserted in its place.

8. The information storage and retrieval system according to claim 1 wherein dynamically decreasing the predetermined limited number of slots enables at least two records with a matching key field value to be in the table simultaneously.

9. The information storage and retrieval system according to claim 1 wherein collisions are resolved using linear probing.

10. The information storage and retrieval system according to claim 1 wherein the information storage and retrieval system is a caching system.

11. The information storage and retrieval system according to claim 1 wherein the computer is a portable electronic device.

12. The information storage and retrieval system according to claim 1 wherein the computer is a server.

13. A method for managing data in an array located in a physical memory of a computer with multi-threading capability using hashing with open addressing, the method comprising the steps of:
    identifying an initial array slot by the computer executing a hashing function applied to a search key value,
    determining whether there is a collision, which occurs when the initial array slot contains data and that data lacks a key field value that matches the search key value,
    probing additional slots in the case of the collision to find a data item whose key field value matches the search key value, or an empty slot, whichever comes first, where the number of additional slots is at least one, and fewer than a predetermined limited number of slots, where the predetermined limited number of slots is more than one and fewer than a number of slots comprising array, wherein the predetermined limited number of slots is dynamically decreased, thereby relinquishing access to those data items that cannot be reached within the decreased predetermined limited number of additional slots, and wherein limiting the number of additional slots enables at least one executing thread among concurrent threads accessing the array to execute without conflict from threads that alter slots of the array.

14. The method according to claim 13 wherein dynamically decreasing the predetermined limited number of slots enables at least two data items with a matching key field value to be in the array simultaneously.

15. The method according to claim 13 wherein a data item in the array is replaced by inserting into its slot another data item with a matching key field value.

16. The method according to claim 13 wherein collisions are resolved using linear probing.

17. A method for managing data in an array located in a physical memory of a computer with multi-threading capability using hashing with open addressing, the method comprising the steps of:
    identifying an initial array slot by the computer executing a hashing function applied to a search key value,
    determining whether there is a collision, which occurs when the initial array slot contains data and that data lacks a key field value that matches the search key value,
    probing additional slots in the case of the collision to find a data item whose key field value matches the search key value, or an empty slot, whichever comes first, where the number of additional slots is at least one, and fewer than a predetermined limited number of slots, where the predetermined limited number of slots is more than one and fewer than a number of slots comprising array, wherein the predetermined limited number of slots is dynamically decreased, thereby enabling at least two data items with a matching key field value to be in the array simultaneously, and wherein limiting the number of additional slots enables at least one executing thread among concurrent threads accessing the array to execute without conflict from threads that alter slots of the array.

18. The method according to claim 17 wherein a data item in the array is replaced by inserting into its slot another data item whose key field value matches the key field value of the replaced data item.

19. The method according to claim 17 wherein collisions are resolved using linear probing.

20. The method according to claim 17 further including the added step of probing additional slots in the case of the collision to find slot into which a first data item can be inserted, where the number of such additional slots is at least one, and fewer than the predetermined limited number of slots, where a second data item whose key field value matches the key field value of the first data item is removed if encountered during the probing.

* * * * *